United States Patent
Devitt et al.

(10) Patent No.: US 11,069,071 B1
(45) Date of Patent: Jul. 20, 2021

(54) SYSTEM AND METHOD FOR EGOMOTION ESTIMATION

(71) Applicant: Compound Eye, Inc., Redwood City, CA (US)

(72) Inventors: Jason Devitt, Redwood City, CA (US); Konstantin Azarov, Redwood City, CA (US); Harold Wadleigh, Redwood City, CA (US)

(73) Assignee: Compound Eye, Inc., Redwood City, CA (US)

( * ) Notice: Subject to any disclaimer, the term of this patent is extended or adjusted under 35 U.S.C. 154(b) by 0 days.

(21) Appl. No.: 17/154,969

(22) Filed: Jan. 21, 2021

Related U.S. Application Data

(60) Provisional application No. 62/963,754, filed on Jan. 21, 2020.

(51) Int. Cl.

| | |
|---|---|
| *G06T 7/20* | (2017.01) |
| *G06T 7/246* | (2017.01) |
| *G06T 7/285* | (2017.01) |
| *G06T 7/292* | (2017.01) |
| *G06T 7/593* | (2017.01) |
| *G06T 7/55* | (2017.01) |
| *G01C 23/00* | (2006.01) |
| *G06T 7/11* | (2017.01) |
| *G01C 22/00* | (2006.01) |
| *G06T 7/269* | (2017.01) |

(52) U.S. Cl.
CPC ............. *G06T 7/248* (2017.01); *G01C 22/00* (2013.01); *G01C 23/00* (2013.01); *G06T 7/11* (2017.01); *G06T 7/20* (2013.01); *G06T 7/246* (2017.01); *G06T 7/269* (2017.01); *G06T 7/285* (2017.01); *G06T 7/292* (2017.01); *G06T 7/55* (2017.01); *G06T 7/593* (2017.01)

(58) Field of Classification Search
CPC ........... G01C 22/00; G01C 23/00; G06T 7/11; G06T 7/20; G06T 7/246; G06T 7/248; G06T 7/269; G06T 7/285; G06T 7/292; G06T 7/55; G06T 7/593
See application file for complete search history.

(56) References Cited

U.S. PATENT DOCUMENTS

| | | | |
|---|---|---|---|
| 2011/0206236 A1* | 8/2011 | Center, Jr. .............. | G06T 7/579 382/103 |
| 2011/0273582 A1* | 11/2011 | Gayko ...................... | G06T 5/50 348/222.1 |
| 2012/0306847 A1* | 12/2012 | Lim .......................... | G06T 7/20 345/418 |
| 2014/0105499 A1 | 4/2014 | Shechtman et al. | |

(Continued)

OTHER PUBLICATIONS

Roberts et al. ("Learning general optical flow subspaces for egomotion estimation and detection of motion anomalies," IEEE Conference on Computer Vision and Pattern Recognition, Jun. 20-25, 2009) (Year: 2009).*

(Continued)

*Primary Examiner* — Yubin Hung

(74) *Attorney, Agent, or Firm* — Jeffrey Schox; Diana Lin

(57) ABSTRACT

A system and method for determining egomotion can include determining correspondence maps between pairs of images of an odometry set; identifying odometry features shared between the images of the odometry set; and determining the egomotion based on the odometry features.

20 Claims, 11 Drawing Sheets

(56) References Cited

U.S. PATENT DOCUMENTS

| | | | |
|---|---|---|---|
| 2014/0112572 A1 | 4/2014 | Reif et al. | |
| 2015/0348273 A1* | 12/2015 | Chapiro | G06K 9/52 348/54 |
| 2016/0196654 A1* | 7/2016 | Aoki | G06T 7/246 382/103 |
| 2017/0161912 A1* | 6/2017 | Yoo | G06T 7/285 |
| 2017/0327127 A1 | 11/2017 | Simon | |
| 2017/0343356 A1 | 11/2017 | Roumeliotis et al. | |
| 2019/0007673 A1 | 1/2019 | Karvounis | |
| 2019/0164040 A1 | 5/2019 | Naroditsky et al. | |
| 2019/0279387 A1* | 9/2019 | Liu | G06T 7/246 |
| 2019/0311485 A1* | 10/2019 | Buczko | G06T 7/97 |
| 2020/0084427 A1* | 3/2020 | Sun | G06N 3/0454 |
| 2021/0065379 A1* | 3/2021 | Zhang | G06K 9/3233 |

OTHER PUBLICATIONS

Rabe et al. ("Fast detection of moving objects in complex scenarios," Proc. IEEE Symp. Intelligent Vehicles, Jun. 2007) (Year: 2007).*

Talukder et al. ("Real-time detection of moving objects from moving vehicles using dense stereo and optical flow," IEEE/RSJ International Conference on Intelligent Robots and Systems, Sep. 28-Oct. 2, 2004) (Year: 2004).*

Zhang et al. ("Visual odometry for the Autonomous City Explorer," IEEE/RSJ International Conference on Intelligent Robots and Systems, Oct. 10-15, 2009) (Year: 2009).*

Podder et al. ("Evolution of Visual Odometry Techniques,"ARXIV (ID: 1804.11142), Apr. 30, 2018) (Year: 2018).*

Scaramuzza, Davide ("Visual Odometry [Tutorial]," IEEE Robotics & Automation Magazine, vol. 18, Is. 4, Dec. 2011) (Year: 2011).*

"Stereo Visual Odometry", Viulib-Vicomtech Solutions, https://www.viulib.org/solutions/s5/stereo_visual_odometry.

Beall, Chris, "Stereo Visual Odometry", CVPR 2014 Visual SLAM Tutorial, Georgia Tech, Institute for Robotics and Intelligent Machines.

Bleyer, Michael, et al., "PatchMatch Stereo—Stereo Matching with Slanted Support Windows", Patchmatch Stereo, 2011.

Cvisic, Igor, et al., "Stereo odeemetry based on careful feature selection and tracking", IEEE 2015, www.cvlibs.net/datasets/kitti/eval_odometry.php.

Fucek, Luka, et al., "Dense Disparity Estimation in Ego-motion Reduced Search Space", Computer Science, Engineering, ArXiv, published 2017, https://arxiv.org/pdf/1708.06301.pdf.

Hisiung, Jerry, et al., "Information Sparsification in Visual-Inertial Odometry", Conference Paper, Proceedings of (IROS) IEEE/RSJ International Conference on Intelligent Robots and Systems, pp. 1146-1153, Oct. 2018.

Lai, Hsueh-Ying, et al., "Bridging Stereo Matching and Optical Flow via Spatiotemporal Correspondence", 2019 IEEE/CVF Conference on Computer Vision and Pattern Recognition (CVPR), Jun. 15-20, 2019, https://ieeexplore.ieee.org/document/8953227.

Mourikis, Anastasios I., et al., "A Multi-State Constraint Kalman Filter for Vision-aided Inertial Navigation", Proceedings 2007 IEEE International Conference on Robotics and Automation, Apr. 10-14, 2007, https://www-users.cs.umn.edu/~stergios/papers/ICRA07-MSCKF.pdf.

Scaramuzza, Davide, et al., "Visual-Inertial Odometry of Aerial Robots", Springer Encyclopedia of Robotics, 2019.

Sivaraj, Hemanthkumar, et al., "Random Walk Based Heuristic Algorithms for Distributed Memory Model Checking", Electronic Notes in Theoretical Computer Science 89, No. 1 (2003) 17 pages URL: http://elsevier.nl/locate/entcs/volume89.html, Year: 2003).

Straub, J., et al., "Fast Relocation for Visual Odometry Using Binary Features", IEEE International Conference on Image Processing (ICIP), Sep. 2013, https://www.researchgate.net/publication/237048601_Fast_Relocalization_For_Visual_Odometry_Using_Binary_Features.

Usenko, Vladyslav, et al., "Direct Visual-Inertial Odometry with Stereo Cameras", 2016 IEEE International Conference on Robotics and Automation (ICRA), May 16-21, 2016, https://ieeexplore.ieee.org/document/7487335.

* cited by examiner

US 11,069,071 B1

SYSTEM AND METHOD FOR EGOMOTION ESTIMATION

CROSS-REFERENCE TO RELATED APPLICATIONS

This application claims the benefit of U.S. Provisional Application No. 62/963,754, filed 21 Jan. 2020, which is incorporated in its entirety by this reference.

TECHNICAL FIELD

This invention relates generally to the visual odometry field, and more specifically to a new and useful system and method in the visual odometry field.

BACKGROUND

Conventional visual odometry methods require distinctive, stationary scene features for operation, and fail when applied to largely featureless scenes (such as highways or rural roads) or scenes with dynamic objects (such as city scenes). As such, conventional visual odometry methods cannot be reliably used in unstructured applications with difficult scenes. Thus, there is a need in the visual odometry field to create a new and useful system and method for enabling visual odometry to be used with difficult scenes. This invention provides such a new and useful system and method.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview.

Figure 2:
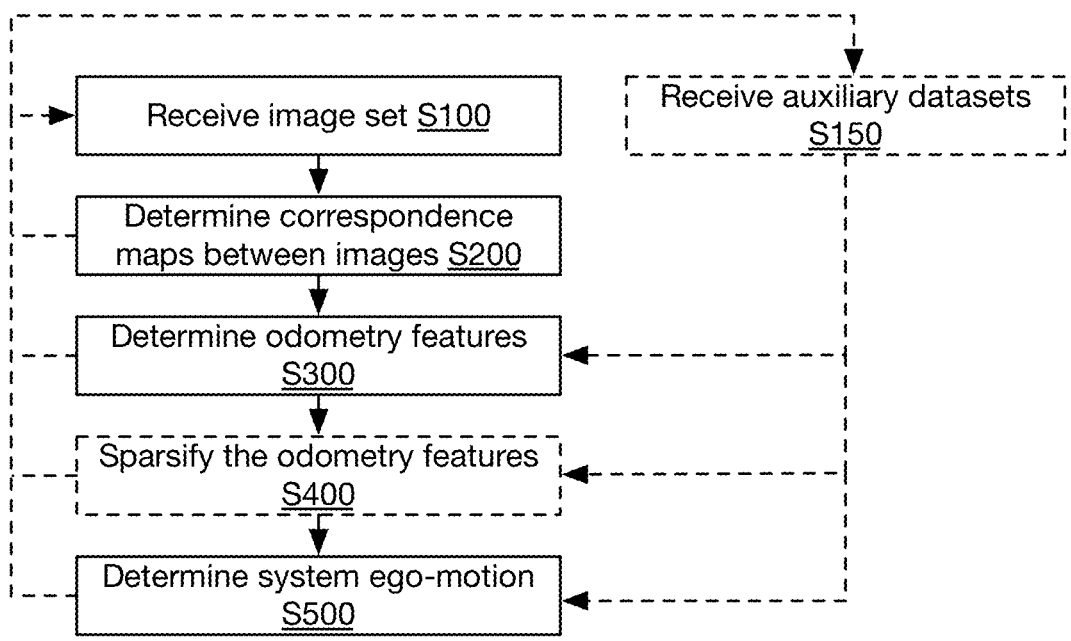
FIG. 2 is a schematic representation of the method.

As shown in FIG. 2, the method 20 can include receiving images S100, determining correspondence maps between images S200, determining features in the images S300, and determining system egomotion based on the features S500. The method can optionally include: sparsifying the features S400, processing the images, determining a pose of the system from the egomotion, determining inertial measurements, selecting an egomotion solution, determining motion of transient objects, and/or any steps.

Figure 1:
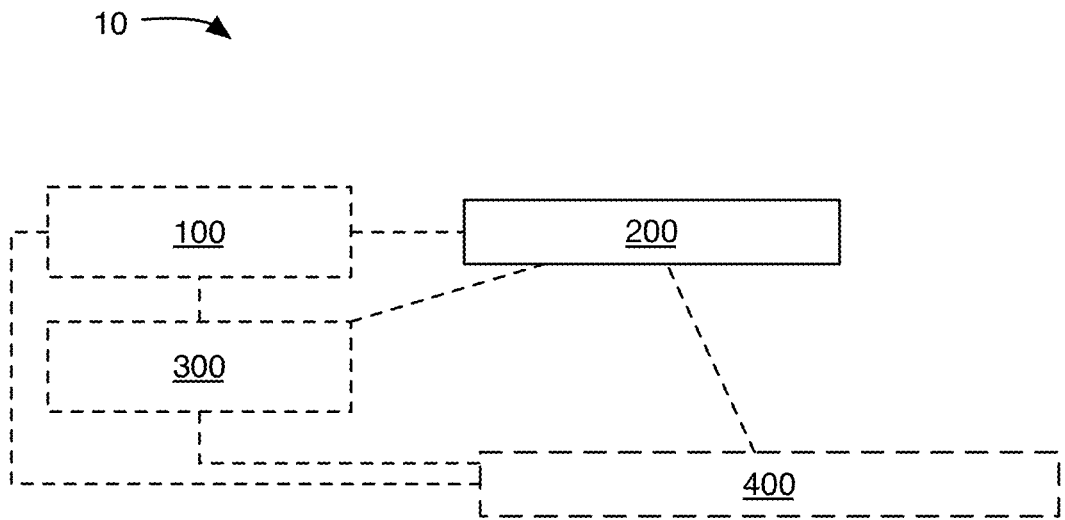
FIG. 1 is a schematic representation of the system.

As shown in FIG. 1, the system 10 can include a computing system 200. The system can optionally include an image acquisition system 100, one or more sensors 300, an external system 400, and/or any components.

The system 10 and method 20 preferably function to determine a pose and/or egomotion of an image acquisition system 100. The image acquisition system 100 egomotion and/or pose can be used to determine the egomotion and/or pose of an external system 400, used for image stabilization, and/or otherwise used.

2. Benefits.

Variations of the technology can confer several benefits and/or advantages.

First, in contrast with conventional visual odometry systems that identify the specific visual odometry features before correlation, this system and method can generate dense correspondence maps between images before identifying the specific features to use in visual odometry. This allows for correspondences to be identified across the entire image frame, instead of just looking for pre-identified features. This is possible because this system and method, unlike conventional methods that use computationally expensive and slow correlation methods, can efficiently generate the correspondence maps in real or near-real time (e.g., contemporaneous with image acquisition). This allows the typical process to be inverted, which can result in a denser set of odometry features.

Second, variants of this technology can identify, match, and/or otherwise determine nondistinct features (e.g., in largely featureless scenes) that can be used for visual odometry and/or visual inertial odometry.

Third, variants of this technology can be compatible with conventional odometry systems, despite generating an overly-dense set of odometry features, by selectively sparsifying the features before odometry system provision.

Fourth, variants of this technology can estimate the odometry of transient objects in the scene. For example, the motion of transient objects in the scene can be determined (e.g., in the same or a similar manner as the motion of permanent objects) and then the absolute motion of the transient objects can be determined by subtracting the egomotion of the external system (and/or image acquisition system) from the transient object motion.

Figure 13A:
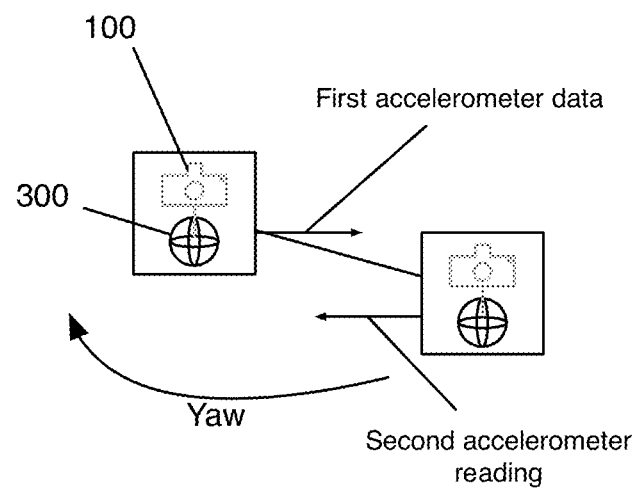
FIGS. 13A and 13B are illustrative examples of using a plurality of accelerometers as virtual gyroscopes to determine a yaw and roll of an image acquisition system, respectively.
Figure 13B:
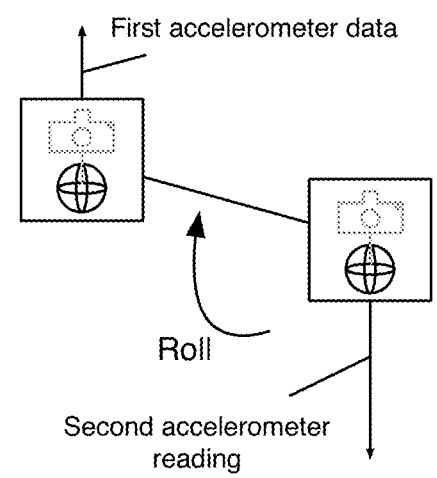

Fifth, variants of this technology can enable accurate measurements of rotations (e.g., pitch, yaw, roll) by combining accelerometer measurements. For instance, accelerometer readings from two accelerometers (at different locations) can be used to generate a virtual gyroscope enabling angular velocity measurements about two axes (as shown for example in FIGS. 13A and 13B) and (generally) accelerometer readings from three or more accelerometers can be used to generate a virtual gyroscope enabling angular velocity measurements about three axes (e.g., using a lever arm effect). In specific examples of the technology, each camera of an image acquisition system can include an accelerometer. In these examples, because the relative camera positions are known (particularly the baseline), the relative accelerometer positions are known (e.g., calculated or inferred from the respective camera positions), enabling the use of the lever arm effect to simulate a virtual gyroscope e.g., without independently calibrating the relative accelerometer positions, without verifying that the accelerometer poses have changed, etc.).

However, variants of the technology can confer any other suitable benefits and/or advantages.

3. System.

As shown in FIG. 1, the system 10 can include a computing system 200. The system can optionally include an image acquisition system 100, one or more sensors 300, an external system 400, and/or any components.

The image acquisition system 100 preferably functions to acquire images. The images can be still images, a timeseries of images, frames of one or more videos, and/or any suitable image(s). The images can be monocular images, image pairs, image triplets, image quartets, image quintets, image sextets, image octets, and/or any number of images. Different images preferably capture different perspectives of the same scene (e.g., taken from different horizontal perspectives, taken from different vertical perspectives, etc.), but can capture the same perspective of the scene (e.g., using different imaging modalities, different imaging wavelengths, etc.).

The image acquisition system is preferably coupled to the computing system 200. However, additionally or alternatively, the computing system can be integrated into the image acquisition system, the image acquisition system can be in communication with the computing system (e.g., via a wired or wireless connection), and/or the image acquisition system and computing system can be otherwise connected or disconnected. Each image acquisition system can be associated with one or more computing systems. Each computing system can be associated with one or more image acquisition systems.

The image acquisition system can include one or more cameras. The image acquisition system preferably includes two or more cameras (e.g., 3, 5, 10, 30, etc.); however, additionally or alternatively, the image acquisition system can include a single camera (e.g., configured to capture video, configured with variable apertures, configured to capture images of distinct portions of a scene on the camera sensor, configured to capture images from different positions, etc.). The cameras can be digital cameras, SLR cameras, thermal cameras, optical cameras, infrared cameras, low light cameras, x-ray detectors, ultraviolet cameras, global shutter cameras, rolling shutter cameras, event cameras, neuromorphic imagers, and/or any suitable camera technology.

The camera(s) can be statically mounted relative to each other (e.g., by a rigid rail, rack, shared housing, external system housing, etc.), semi-rigidly mounted (e.g., fixed such that during normal operation they reorient and/or move by less than 1°, 2°, 5°, 10°, etc. pixel dimensions such as length and/or width), rigidly mounted (e.g., during normal operation, the camera and/or sensor elements of the camera move by less than 1 pixel dimension), flexibly mounted relative to each other (e.g., via an external system housing, by actuation mechanisms, etc.) loosely mounted, actuatably mounted (e.g., mounted to a movable arm or a track), unmounted (e.g., freehand), and/or mounted in any suitable manner. The cameras are preferably mounted to each other (e.g., via an intermediary housing, mounting substrate, bar, etc.), but can alternatively be mounted to a common mounting surface (e.g., an external system), or other surface.

The separation between the camera(s) (e.g., between two cameras, between images captured with one camera wherein the camera has moved between the image acquisition, "baseline", etc.) is preferably known; however, the separation can be unknown (e.g., in variants configured to determine odometry). The baseline is preferably at least a minimum distance (e.g., 10 cm, 50 cm, 1 m, 5 m, etc.). However, the cameras can alternatively be arranged within a predetermined distance and/or otherwise be arranged. The cameras can be arranged along a common horizontal reference (e.g., image sensors for each camera are aligned to the same horizontal reference line), a common vertical reference, arranged in a grid, and/or be otherwise arranged.

Adjacent cameras preferably have overlapping fields of view (e.g., such that the cameras can capture overlapping features), but can have any other suitable field of view. In specific examples, the separation distance is preferably chosen such that the pairwise images overlap by at least ¼ of the images' view; however, the two or more images or captured frames can be otherwise related. The field of view for the image acquisition system is preferably between about 180° and 360°, but can be less than 180°. The field of view for each camera is preferably at least about 100° (e.g., 100°, 120°, 150°, 180°, 200°, 210°, 235°, 250°, 270°, 300°, 330°, 360°, values therebetween), but can be less than 100°. The field of view can refer to the horizontal field of view, vertical field of view, diagonal field of view, and/or any suitable field of view. Each camera can have the same field of view or a different field of view. In a first illustrative example, each camera can have an approximately 360° field of view. In a second illustrative example, one camera of the image acquisition system can have an approximately 360° field of view and the remaining camera(s) can have a field of view that is less than 360°. In a third illustrative example, an image acquisition system can include at least four cameras, each camera having a field of view that is approximately 100° (e.g., ±1°, 5°, +10°, +20°, etc.), which can enable the image acquisition system to have up to an approximately 360° field of view (e.g., by having the cameras pointing in or facing different directions). In a fourth illustrative example, each camera can have an approximately 1000 field of view, which can enable the image acquisition system to have a field of view between about 110° and 200°. However, the image acquisition system and/or cameras thereof can have any suitable field of view.

The position of the image acquisition system relative to the external system is preferably known (e.g., during calibration, during setup, dynamically determined during operation, etc.) and represented by one or more transformation matrices, but can alternatively be unknown.

Figure 10:
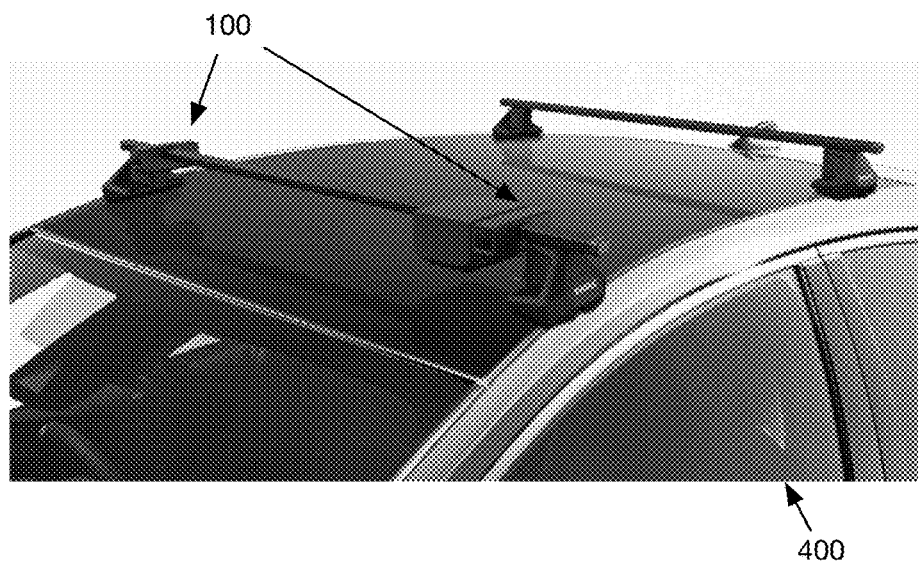
FIG. 10 is an illustrative example of the system.

The system can include one or more image acquisition systems 100 (example shown in FIG. 10). In a first example, the system includes a single image acquisition system (e.g., a stereocamera pair, a single monocular camera, etc.). In a second example, the system includes multiple image acquisition systems (e.g., multiple stereocamera pairs, multiple monocular cameras, etc.). In the second example, the multiple image acquisition systems can be statically mounted (e.g., to the same mounting surface, same rail, same housing, etc.), actuatably mounted (e.g., via gimbals, arms, linkages, etc.), flexibly mounted, or otherwise related. The locations of the image acquisition systems relative to each other is preferably known (e.g., determined during calibration, setup, dynamically determined, etc.), unknown, or otherwise determined.

The sensor(s) 300 preferably function to acquire auxiliary data that can be used to determine and/or improve determination of features. The sensor data can optionally be used to determine the system egomotion. The sensors are preferably collocated with the image acquisition system, which can function to generate a known sensor position. The sensors can be mounted to: the camera's printed circuit board (PCB), the image acquisition system's housing, a mounting surface shared with the image acquisition system, mounted within a predetermined distance of the camera (e.g., 10 inches, 10 cm, etc.), and/or otherwise collocated with the camera(s). The relative pose of each IMU to its respective camera is preferably known (e.g., from a calibration), but can be unknown, determined during operation, and/or otherwise be determined. However, the sensor(s) can be otherwise mounted to the image acquisition system and/or separate from the image acquisition system (e.g., independently mounted to the external system). In a first example, each camera of the image acquisition system 100 includes an independent sensor set. In a second example, the image acquisition system 100 includes a sensor set, wherein the sensor set is shared between the cameras of the image acquisition system 100.

The sensors 300 are preferably inertial sensors (e.g., inertial measurement unit (IMU) sensors, accelerometers, gyroscopes, etc.), but can additionally or alternatively be altimeters, magnetometers, wheel encoders, depth sensors (e.g., ultrasound, LIDAR, etc.), location sensors (e.g., GPS system, trilateration systems, etc.), acoustic sensors, (e.g., microphones, ultrasound, radar, etc.), and/or any suitable sensors. Examples of IMU sensors can be: mechanical (e.g., MEMS, gyrostat, hemispherical resonator, vibrating structure gyroscope or Coriolis vibrator, dynamically tune gyroscope, etc.), gas-bearing, optical (e.g., ring laser gyroscope, fiber optic gyroscope, etc.), quantum (e.g., London moment gyroscope), crystal (e.g., piezoelectric), electromechanical, and/or other IMU technology(s). When more than one sensor is present, each sensor is preferably the same, but the sensor(s) can be different.

The computing system 200 functions to perform all or portions of the method. The computing system can additionally or alternatively function to process the image(s), sparsify the features, determine correspondence maps between images, perform any other step(s) of the method and/or otherwise function. The computing system can be local (e.g., to the image acquisition system or one or more cameras thereof, to a sensor, to the external system, etc.), remote (e.g., cloud computing, server, etc.), and/or be distributed in any manner.

The computing system 200 can include one or more modules configured to perform all or portions of the method. For example, the computing system 200 can include: a correspondence mapping module configured to perform S100, a feature extraction module configured to perform S300, a sparsification module configured to perform S400, an egomotion module configured to perform S500, a combination thereof, and/or any other suitable set of modules.

The external system 400 functions to traverse through a scene. The external system 400 can optionally function as a mounting surface for portions or all of the system. Examples of external systems 400 include vehicles (e.g., cars, trucks, locomotives, nautical vehicles, aerial vehicles, etc.), robots, a navigation system, and/or any other system. The external system 400 can be autonomous, a semi-autonomous, a manually-controlled, remotely controlled, and/or be otherwise controlled. The external system 400 can optionally include a localization system, a navigation system, and/or any other suitable control system that can consume the egomotion and/or pose output by the system.

4. Method.

As shown in FIG. 2, the method 20 can include receiving images S100, determining correspondence maps between images S200, determining features in the images S300, and determining system egomotion based on the features S500. The method can optionally include: sparsifying the features S400, processing the images, determining a pose of the system from the egomotion, determining inertial measurements, selecting an egomotion solution, determining motion of transient objects, and/or any steps.

The method 20 preferably functions to determine an egomotion of a system (e.g., a system as described above, an external system, an image acquisition system, etc.). The egomotion can be an absolute motion (e.g. absolute motion relative to an external reference frame, such as a global reference frame), or a relative motion (e.g., relative to a starting point, end point, reference point, a previous system pose, etc.). The method can optionally function to determine the system pose (e.g., image acquisition system pose, external system pose). The system pose can be determined for each of a set of timepoints, and can be: absolute pose (e.g., within a global reference frame), a relative pose (e.g., relative to a reference), and/or any other suitable pose. The method is preferably performed in real- or near-real time with image sampling and/or external system operation, but can be performed asynchronously.

Receiving images S100 functions to receive a plurality of images that can be used to determine the egomotion of the system. The images are preferably acquired by the image acquisition system, but can be retrieved from the computing system (e.g., an image database, memory, etc.) and/or otherwise be received. Each image is preferably associated with a time stamp and/or time window (e.g., the time of acquisition, the order of acquisition, etc.).

The images can be grouped into odometry sets (e.g., analysis sets) where the odometry set can include sequential images (e.g., from the same camera), contemporaneous images (e.g., concurrently sampled images from cameras with overlapping fields-of-view), both sequential and contemporaneous images, and/or any images. In an illustrative example, the odometry sets 112 can include image pairs from at A least two time stamps (example shown in FIG. 12). The time stamps can be consecutive or nonconsecutive. However, the odometry sets can include any number of images and/or any suitable images. The odometry sets can be redefined for each timestep (e.g., be a sliding window applied to the image timeseries) or otherwise be defined. The images within an image pair can be sampled by a first and second camera (e.g., with overlapping fields-of-view; adjacent cameras; nonadjacent cameras; etc.), a single camera, or otherwise sampled. The images within the image pair at distinct timestamps are preferably sampled using the same cameras, but can be sampled with any camera(s).

The odometry set preferably includes at least four images, wherein the method can process images in quads (groups of four), but can additionally or alternatively include more or less (e.g., 2 images, 6 images, 7 images, etc.). The four images can be referred to as the first, second, third, and fourth images. The names are used to distinguish the images, but do not indicate anything about the time or order at which they were acquired, or their relative positioning. The element numbering used herein for the images (110a, 110b, 110c, 110d) is for illustrative purposes only; any image can be mapped to the element numbering. The first and second images can be a stereo-image pair acquired substantially concurrently (e.g., within at most 30 ms of one another) and/or associated with a common time stamp. Similarly, the third and fourth images can be a stereo-image pair acquired substantially concurrently and/or associated with a second common time stamp (before or after the time stamp associated with the first and second image). The first and third images can be acquired using the same camera (and/or a camera in the same position), for instance as frames of a video. Similarly, the second and fourth images can be acquired using the same camera (e.g., a different camera from the camera used to acquire the first and third images, a camera in a second position, etc.). However, the images can be otherwise related. In variations of this example, the first and third image can be consecutive or nonconsecutive frames of a video (and similarly for the second and fourth images).

In an illustrative example, a first and second camera sample a first and second image timeseries, respectively. Odometry sets can be determined for each timestep, wherein each odometry set includes images sampled at a first and second timestep by the first and second cameras (e.g., images sampled at t and t−1 within the respective image timeseries). In a second illustrative example, a stereocamera pair can capture a timeseries of stereoimages, wherein the odometry sets for each timestep can include stereoimages from a first and second timestep.

S100 can include receiving auxiliary sensor data S150, which can function to provide auxiliary data that can be used to process the images (e.g., stabilize the images), validate correspondence vectors, validate a visual odometry solution, be indicative of component motion, and/or otherwise function. The auxiliary data (e.g., IMU data) can be acquired at the same time as the images (e.g., concurrently, contemporaneously), more frequently than the images, less frequently than the images, and/or at any suitable frequency. The auxiliary sensor data is preferably associated with an image acquisition system, more preferably an image sensor (e.g., the image sensor that the sensor shares a circuit board, clock, mounting surface, housing, etc. with; image sensor that is otherwise associated with auxiliary sensor), but can alternatively be associated with: an image, a set of images, multiple image sensors, the system as a whole, the external system, and/or be associated with any other suitable data or component. The auxiliary data can be received from a sensor, from a sensing system, a computing system (e.g., a database), and/or be received from any system. The auxiliary sensor data can be synchronized between sensors and/or be unsynchronized.

S150 can optionally include denoising the inertial measurements, which can function to increase the accuracy and/or precision of inertial measurements. The inertial measurements can be denoised using: outlier rejection, filtering, cross-correlation, computation of an inertial parameter using disparate measurements (e.g., calculating rotation using relative acceleration at two different system positions), and/or otherwise be denoised. Acceleration measurements, rotational velocity measurements, magnetic orientation, and/or any suitable measurements can be denoised. For instance, rotational velocity measurements can be denoised or redundantly calculated in applications where rotational error is more critical (e.g., compounds endpoint error more) than other measurements (e.g., acceleration measurements). However, any suitable measurements can be denoised.

In variants, the inertial measurements can be redundantly calculated using different sensor types. For example, the measurements from two or more IMU accelerometers (e.g., mounted to the cameras) can be used to augment and/or replace gyroscopic measurements, thereby cooperatively functioning as a "virtual gyroscope." This example can include: calculating a system yaw and/or roll based on the relative motion of a first and second accelerometer, mounted at a first and second position on the system (e.g., along a common transversal axis). The system yaw and/or roll can be calculated based on: the inertial measurements of the first and second accelerometers, an extrinsic matrix describing the relative pose of the sensor modules (e.g., the accelerometers; the IMU-camera modules; etc.), and/or other data. The extrinsic matrix can be calibrated online (e.g., during external system operation), be factory-calibrated, be calibrated concurrently with the baseline calibration between cameras, and/or otherwise be calibrated.

S100 can optionally include processing the images, which functions to modify (e.g., translate, rotate, etc.) one or more images to ensure that the images are co-planar and aligned to have parallel epipolar lines, generate a rectified image set (e.g., rectified image pair), modify one or more images (e.g., remove bad pixels, remove blur, change brightness and/or contrast, etc.) and/or perform any suitable function. Processing the images can include rectifying the image, scaling at least one of the images (e.g., scaling the pixel size, scaling the full image, to match another image size, etc.), converting the images (e.g., from color images to greyscale, compress the image file, interpolating between pixels of the image(s) etc.), and/or can include any suitable steps. In a specific example, rectifying the images can include rectifying the images using the Hartley method, which can include the steps of determining sparse correspondences, estimating a fundamental matrix, and computing projective transformations to map the epipoles of the image pair to infinity. In this specific example, rectifying the images can generate new values for the effective focal length of the image acquisition system and the effective distance between the centers of projection. However, rectifying the images can be performed in any suitable manner.

Determining a correspondence map between images S200 functions to identify matching features within the images of an image set (e.g., image pair, odometry set), where the match is indicated by a correspondence vector associated with each feature. The matched features can depict the same points in the scene, or represent any other suitable physical feature. The correspondence vectors for features of an image cooperatively form a correspondence map. The correspondence map m can be a disparity map (e.g., be determined between concurrent images, indicative of binocular parallax), an optic flow map (e.g., be determined between consecutive images acquired by a common camera, indicative of motion parallax), and/or include any suitable correspondence map. The correspondence map is preferably dense or semi-dense (e.g., includes valid correspondence vectors for more than a threshold proportion of pixels, such as >10%, >25%, >50%, >75%, >90%, and/or ranges therebetween), but can be sparse and/or have any suitable density. The features can include: pixels, superpixels, blocks of pixels, pixel sets, structures (e.g., edges, corners, objects, etc.), and/or any information within the images. The features can be nondistinctive or distinctive. Correspondence map determination can be facilitated via feature tracking, using previously determined correspondence maps, and/or otherwise be facilitated.

Correspondence maps are preferably determined for each odometry set, but can alternatively be determined for a subset thereof. Correspondence maps are preferably determined between each concurrent image pair and each consecutive image pair within an odometry set (e.g., wherein S200 is performed at least four times), but can additionally or alternatively be determined between all images 110 within an odometry set. However, the correspondence maps can be determined for any other suitable set of images 110.

S200 is preferably iteratively performed at every timestep (e.g., each time a new concurrent image set is sampled or received), but can be performed at a predetermined frequency, in response to a trigger (e.g., receipt for egomotion determination from the external system), and/or at any other suitable time.

In a first variant, determining the correspondence map S200 can include: determining pixel representations for pixels in each image of an analysis set, determining a set of correspondence vectors, determining a cost associated with each correspondence vector (based on the pixel representations of the pixels identified by the correspondence vector), and updating the correspondence map based on the cost. Determining the correspondence map can be iterative (e.g., until a condition is met such as a predetermined number of iterations, a predetermined correspondence map quality, etc.) or single-shot. Determining the correspondence map can optionally include removing errant pixels (e.g., outliers, vectors that are inconsistent with the auxiliary data, etc.).

In an example of the first variant, determining the correspondence map S200 can include acquiring two images. Each pixel from each image can be converted to a bit string. The bit string (e.g., pixel hash) for an analysis pixel can be determined by comparing the intensity of the analysis pixel to each of a set of bit string pixels, wherein the bit string pixels are determined according to a low discrepancy sequence and collectively span a pixel block associated with (e.g., adjacent) the analysis pixel. The correspondence map for the first image can be initialized, for example by generating a correspondence vector for each pixel or using a correspondence map from a prior timestep. The correspondence vector for each pixel can be generated, for example, using a Halton sequence, and can be assigned to each pixel along a correspondence vector assignment path. The pixels from the first image can then be compared to pixels from the second image (e.g., by determining a Hamming distance between the bit string associated with each pixel), wherein the pixel in the second image is specified by the correspondence vector. The cost for each of the correspondence vectors can be stored. The correspondence map can be updated by generating new correspondence vector estimates (e.g., candidate correspondence vectors) for each of the pixels from the image based on the correspondence vectors for adjacent pixels neighboring the respective pixel. The pixel comparison and correspondence map updating can be iteratively performed until a stop condition is met (e.g., average or highest cost falls below a threshold, predetermined number of iterations, etc.). A second correspondence map can optionally be determined for pixels of the second image (e.g., compared to the pixels of the first image) in a similar manner to first correspondence map determination. The second correspondence map can be determined concurrently, serially, or in any other suitable order relative to determination of the first correspondence map. If the second correspondence map matches the first correspondence map (e.g., based on a validation criterion), then the matching correspondence map (or portions thereof) can be stored, and/or used to determine one or more outputs. Determining the correspondence map can optionally include refining the correspondence map to generate a sub-pixel accurate correspondence map (e.g., using a neural network, secondary pixel representation, etc.).

In a second variant, determining the correspondence map(s) can be performed according to the method or steps thereof as disclosed in U.S. application Ser. No. 16/936,269 filed 22 Jul. 2020 entitled "PASSIVE STEREO DEPTH SENSING" and/or U.S. application Ser. No. 17/104,898 filed 25 Nov. 2020 entitled "SYSTEM AND METHOD FOR CORRESPONDENCE MAP DETERMINATION" each of which is incorporated in its entirety by this reference.

In a third variant, the correspondence map and/or features to be matched between the images can be determined using Harris algorithm, using machine learning, features from accelerated segment test (FAST), using oriented FAST and rotated binary robust independent elementary features (BRIEF) (ORB), speeded-up robust features (SURF), scale invariant feature transform (SIFT), binary robust invariant scalable keypoints (BRISK), and/or other feature detection algorithms; and/or in any manner.

However, the correspondence maps can be determined in any manner.

In an illustrative example (shown in FIG. 4), S200 preferably includes determining a disparity map between images no acquired by stereo cameras at the same time point and determining optic flow maps between images acquired by the same camera at different time points. A first disparity map can be determined between the first image 110*a* and second image 110*b* (e.g., correspondence vectors mapping features from the first image 10*a* to the second image 110*b*, correspondence vectors mapping features from the second image 110*b* to the first image 110*a*) and a second disparity map can be determined between the third image 110*c* and fourth image 110*d* (e.g., correspondence vectors mapping features from the third image 110*c* to the fourth image 110*d*, correspondence vectors mapping features from the fourth image 110*d* to the third image 110*c*). In a second illustrative example, a first optic flow map can be determined between the first image 10*a* and third image 110*c* (e.g., correspondence vectors mapping features from the first image 10*a* to the third image 110*c*, correspondence vectors mapping features from the third image 110*c* to the first image 110*a*) and a second optic flow map can be determined between the second image 110*b* and fourth image 110*d* (e.g., correspondence vectors mapping features from the second image 110*b* to the fourth image 110*d*, correspondence vectors mapping features from the fourth image 110*d* to the second image 110*c*). However, correspondence maps can additionally or alternatively be determined between the first and fourth images, between the second and third images, and/or any suitable set of images 110.

Figure 11:
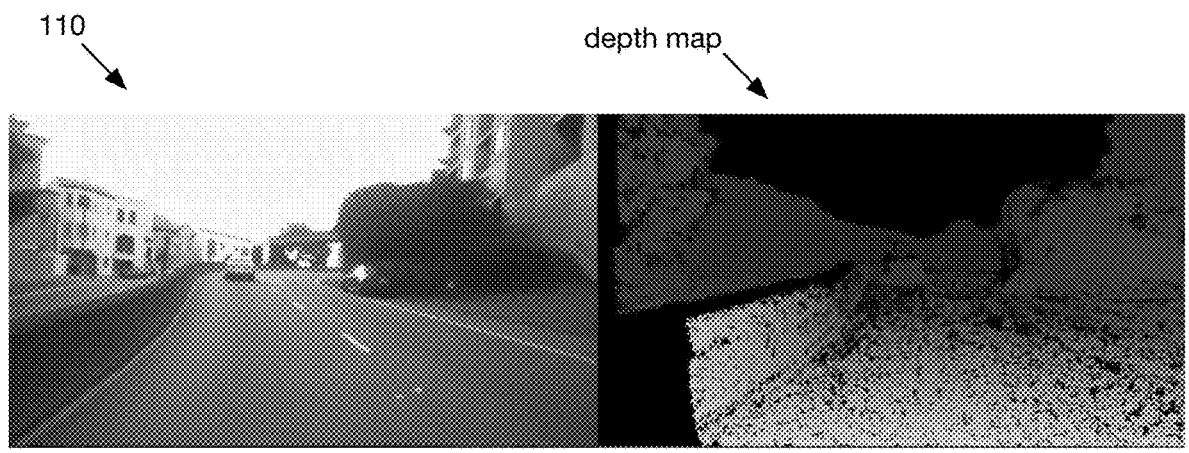
FIG. 11 is an illustrative example of an image and the corresponding depth map determined using variants of the method.

The correspondence maps can optionally be used to determine depth maps, example shown in FIG. 11 (e.g., wherein the matched features can be used to calculate depth based on the associated parallax and an essential matrix). In variants, a depth map can be determined from the disparity map (e.g., using an essential matrix relating the contemporaneous or concurrent images), a depth map can be determined from the optic flow map (e.g., using an essential matrix relating the sequential images), and/or a depth map can be otherwise determined.

However, the correspondence maps can be determined in any manner.

Determining the odometry features S300 functions to determine (e.g., select, identify, etc.) features to use to determine the egomotion of the system. The odometry features are preferably a subset of the features identified (e.g., matched) by the correspondence maps (e.g., in S200), but can be any suitable features. The odometry features 120 are preferably determined from images of the odometry set, but can be determined from all images and/or any subset thereof. The odometry features 120 preferably represent static objects (e.g., fixed, nonmobile, immobile, permanent, etc.) in the environment that are depicted by the images within the odometry set. The motion depth, and/or size (e.g., pictorial cues) of the static object relative to the image sensor over time can be used to determine the system's motion relative to the environment. A static object (e.g., immobile object) can be a physical object that is fixed to the scene and preferably does not change appearance or pose over time, but can be otherwise defined. However, the odometry features can represent temporary objects (e.g., transient over time), mobile objects (e.g., changing or able to be changed relative to the environment such as a car or digital billboard), stationary objects, fixed (e.g., mounted to the environment) or unfixed (e.g., not fixedly mounted to the environment) permanent objects, intransient objects, and/or objects that are otherwise characterized. Examples of objects that the odometry features can be associated with include: fixed or permanent signage (e.g., traffic signs, stop signs, traffic signals, billboard frames, road letting, etc.), fixed or permanent construction (e.g., buildings, roads, sidewalks, etc.), and/or other objects. S300 is preferably performed after S200, but can be performed during and/or before S200.

Candidate features that are evaluated for inclusion in the odometry feature set (e.g., odometry feature candidates) can be: determined from the set of correspondence maps associated with the odometry set; be determined from the images; be the odometry features from a prior timestamp (e.g., features appearing in the earlier images of the odometry set; previously tracked features; etc.); or be any other suitable feature. Candidate features can be determined (e.g., selected) from one or more images: randomly, selected using a low discrepancy sequence, be features associated with a predetermined label (e.g., from the semantic segmentation), be every feature within an image, be selected based on one or more correspondence maps (e.g., be features with correspondences in a threshold number of other images), and/or be otherwise determined.

A candidate feature is preferably included as an odometry feature when the candidate feature satisfies an odometry criteria. However, a candidate feature can be considered an odometry feature based on feature tracking (e.g., tracking a candidate feature or a prior odometry feature across a sequence of images), feature matching between consecutive images such as stereo images, identifying unique scene features in the scene (e.g., using an auxiliary sensing system) and determining the features within each image corresponding to the unique scene features, and/or otherwise be included as an odometry feature.

The odometry criteria can include a cyclic mapping (e.g., a cyclic correspondence criterion), diagonal matching, calculated correspondence vectors matching a previously determined correspondence vector, agreement between multiple correspondence vectors (e.g., between different image pairs), feature tracking, and/or any suitable criteria. The odometry criteria can be satisfied when a candidate feature (e.g., a candidate feature from an image) is within a predetermined distance (e.g., pixel distance, metric distance, scene distance, etc.) of a target feature (e.g., target feature in a different image), a candidate feature is in exactly the same position as a target feature, a correspondence vector is within a predetermined distance of a target correspondence vector, a correspondence vector (e.g., correspondence vector along a first path) is exactly the same as a target correspondence vector (e.g., correspondence vector along a second path), and/or otherwise be characterized.

Figure 3A:
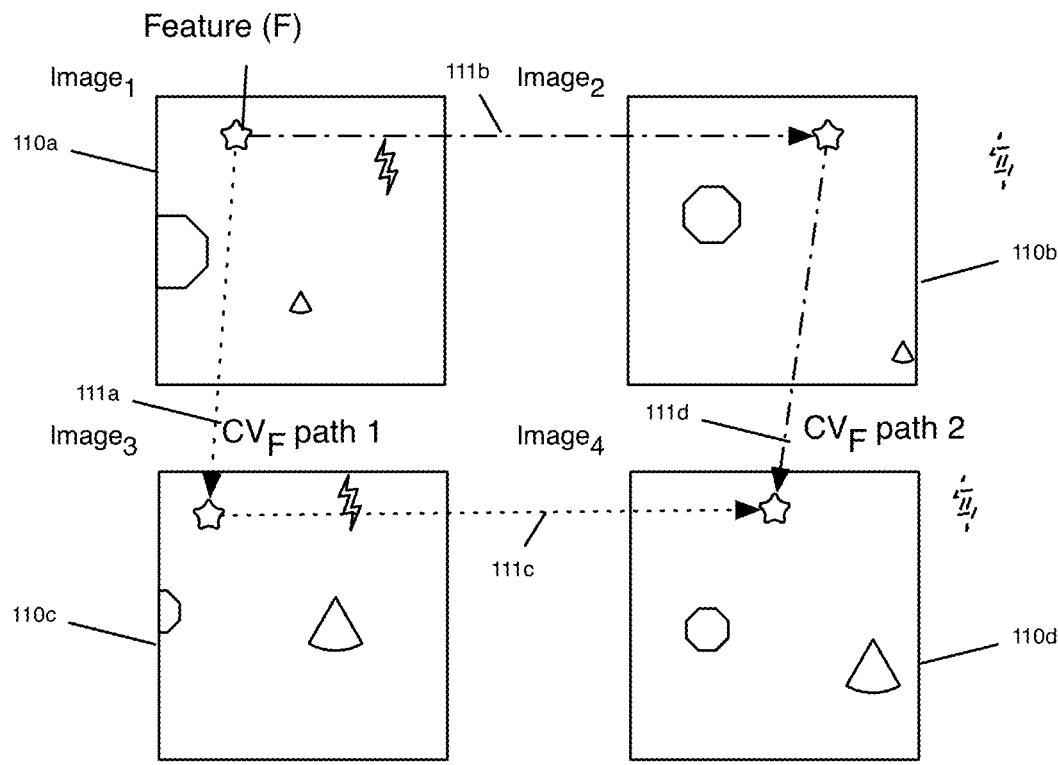
FIGS. 3A and 3B are schematic representations of a first and second example of a cyclic consistency criterion, respectively.

In a first embodiment of S300 (as shown for example in FIG. 3A), an odometry criterion can include a cyclic consistency criterion between images, where a feature from one image of the odometry set maps to the same feature (e.g., same position, within a threshold distance, etc.) in another image of the odometry set along different mapping pathways. The features can be traced across time, across images, across space, using correspondence maps, and/or in any manner.

In an illustrative example of the first embodiment, a feature can be traced from the first image 110*a* to the fourth image 110*d* along two paths. For instance, the first path can trace the feature from the first image 110*a* to the third image 110*c* (e.g., using a correspondence vector 111*a* from a first optic flow map) and then trace the feature from the third image 110*c* to the fourth image 110*d* (e.g., using a correspondence vector 111*c* from a second disparity map). The second path can trace the feature from the first image 110*a* to the second image 110*b* (e.g., using a correspondence vector 111*b* from the first disparity map) and from the second image 110*b* to the fourth image 110*d* (e.g., using a correspondence vector 111*d* from the second optic flow map). However, the feature can be traced between any pair of images (e.g., between the first and third image, the first and second image, the second and third image, the second and fourth image) following any paths (e.g., any combination of the first and second disparity map, the first and second optic flow, and/or a correspondence map between the first and fourth or second and third images that connects the pair of images). In a second example, features whose correspondence vectors are consistent across the correspondence maps in are selected as odometry features.

Figure 3B:
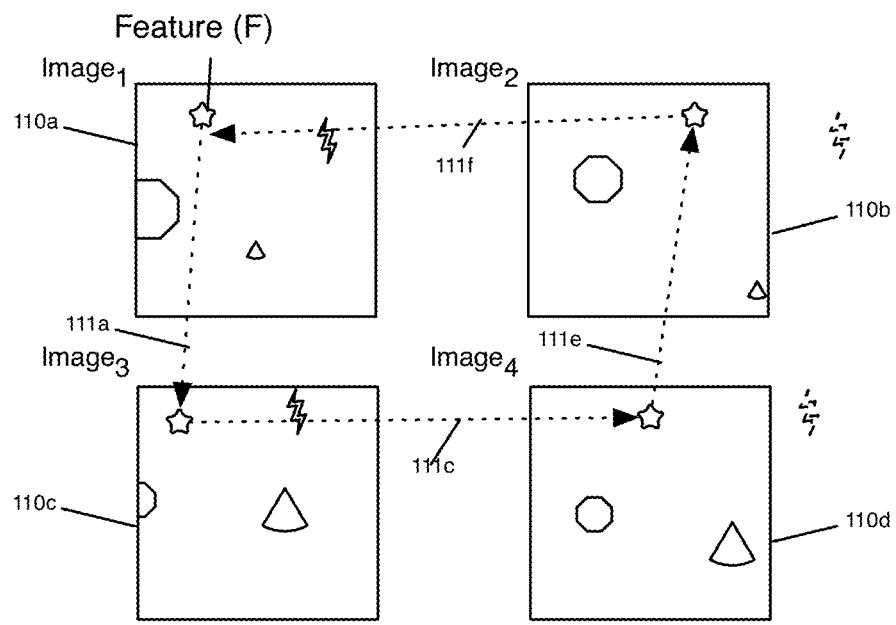

In a second embodiment (example shown in FIG. 3B), an odometry criterion can include a cyclic mapping between images of the odometry set, where the distance between a set of points should remain invariant or less than a predetermined distance after a full cycle formed by tracing the correspondence vectors for the features through the images with an odometry set.

In a first illustrative example of the second embodiment, a feature can be traced from first to the third image (e.g., using a correspondence vector 111*a* from the first image's optic flow map), from the third to fourth image (e.g., using a correspondence vector 111*c* from the third image's disparity map), from the fourth image to the second image (e.g., using a correspondence vector 111*e* from the fourth image's backward optic flow map), and from the second image back to the first image (e.g., using a correspondence vector 111*f* from the second image's disparity map); and determining if the resultant feature position in the first image is within a predetermined distance of the starting feature.

In a second illustrative example of the second embodiment, a feature can be traced from first to the second image (e.g., using first image's disparity map), from the second to fourth image (e.g., using second image's optic flow map), from the fourth image to the third image (e.g., using fourth image's disparity map), and from the third image back to the first image (e.g., using the third image's backwards optic flow map); and determining if the resultant feature position in the first image is within a predetermined distance of the starting feature.

In a third embodiment, an odometry criterion can include calculating a feature position in a diagonal image of the odometry set (e.g., a different time stamp and different image sensor) using two sets of correspondence maps (e.g., the first optic flow and the second disparity map, the first disparity map and the second optic flow, etc.) and determining whether the calculated feature positions match.

In a fourth embodiment, an odometry criterion can include calculating a correspondence vector associated with a feature of a feature for a given image based on the correspondence vectors for the feature in the other images and determining whether the calculated correspondence vector matches the correspondence vector of the given image. For example, a calculated correspondence vector can be generated by adding the correspondence vector for a feature along the first optic flow, the second disparity map, and the second optic flow (e.g., backwards second optic flow) and can be compared to the correspondence vector for the feature from the first disparity vector.

In a fifth embodiment, two or more of the first through fourth embodiments can be used, for example to provide redundancy to the odometry feature selection.

However, the odometry features can be otherwise selected.

Sparsifying the odometry features S400 (sometimes referred to as prefiltering or sieving the odometry features) functions to generate a sparse set of features. The sparsified features are preferably odometry features (e.g., determined in S300), but can be features determined in generating the correspondence map (e.g., features from S200), and/or include any suitable features.

S400 is preferably performed after S300, but can be performed at the same time as (e.g., apply sparsification rules or processes to the images of the odometry set so that a smaller proportion of the images can be searched for features) and/or before S300. S400 can be performed when more than a threshold number of odometry features are identified in S300; always be performed; performed when a computing metric (e.g., runtime, % CPU, CPU time, amount of memory, etc.) for egomotion calculation exceeds a predetermined threshold; and/or at any other suitable time.

The sparsified features are preferably determined (e.g., selected, identified, etc.) based on one or more sparsification criteria, but can be otherwise determined. The features satisfying the sparsification criteria can be excluded from the sparsified feature set, included within the sparsified feature set, and/or otherwise managed based on the sparsification criteria satisfaction. The sparsification criterion can include: an object class (e.g., wherein features associated with predetermined object classes are included or excluded from the sparsified feature set), feature motion, holonomic or nonholonomic constraints, consistency checks, outlier rejection (e.g., using RANSAC), and/or any suitable criterion. One or more sparsification criterion can be used. Multiple sparsification methods can be applied serially, in parallel, and/or in any order.

In a first variant, sparsifying the features can include determining object classes (e.g., labels) for each feature (e.g., each feature of the odometry feature set) and removing or including features associated with a predetermined set of object classes. Object classes can include: a characteristic (e.g., mobile, such as capable of moving, probability of moving greater than or equal to a threshold probability of moving, etc.; nonmobile such as incapable of moving, probability of moving less than or equal to a threshold probability of moving, etc.; transient; intransient; stationary; nonstationary, etc.), object type (e.g., vehicles, pedestrians, animals, road, windmills, billboards, plants, signs, buildings, manmade objects, etc.; wherein each object type can be associated with a predetermined set of characteristics), and/or other classes. Examples of objects that would be classified as mobile, even though they can be stationary depending on the time and situation, can include: vehicles, windmills, billboards, plants, signs, and/or any suitable objects that can change appearance and/or pose with more than a predetermined frequency.

In a first illustrative example of the first variant, an object class or label can be determined for image segments, where each feature can inherit the label or class of the image segment that the feature is part of. In a second illustrative example of the first variant, an object class or label can be determined for each feature (e.g., pixel). Pixels or features that are in transient or mobile segments can be excluded from the sparsified feature set. Pixels or features that are in permanent or immobile segments can be included in the sparsified feature set.

In a second illustrative example of the first variant, at least one of the first, second, third, or fourth images (from an odometry set) can be segmented into transitory (e.g., transient) segments and permanent segments, features associated with transitory segments can be excluded from the odometry features, and/or features associated with permanent segments can be included in the odometry features.

Object classes or labels are preferably determined using semantic segmentation, but can additionally or alternatively be determined using instance-based segmentation or be otherwise determined. For example, an object class can be determined using a neural network (e.g., a convolutional neural network, a deep neural network, etc.) trained to label image segments based on: at least one image of the odometry set, optionally the images disparity map optic flow map, and/or depth map determined therefrom, auxiliary sensor data (e.g., IMU data), and/or other inputs. The neural network can output semantic labels for each image segment (e.g., each feature, each contiguous set of features, each pixel, each blob, each super pixel, etc.), and can optionally output a denser depth map. The neural network can be trained using a 3D representation of a scene (e.g., a prerendered or generated 3D representation, a model of the scene, a previously acquired 3D representation, etc.), using a training dataset, using manually entered data, using pictorial cues, using parallax cues, and/or using any suitable training dataset.

In a specific example, an image (e.g., RGB, grayscale) and its associated correspondence map can be provided to the neural network, wherein the neural network can output a semantic segmentation (e.g., pixel-aligned with the correspondence map) and can optionally output a denser correspondence map. In a second specific example, a depth map can be determined based on the correspondence map (from the first specific example) and provided to the neural network with the corresponding image, wherein the neural network can output a semantic segmentation of the image and optionally output a denser depth map.

Figure 8:
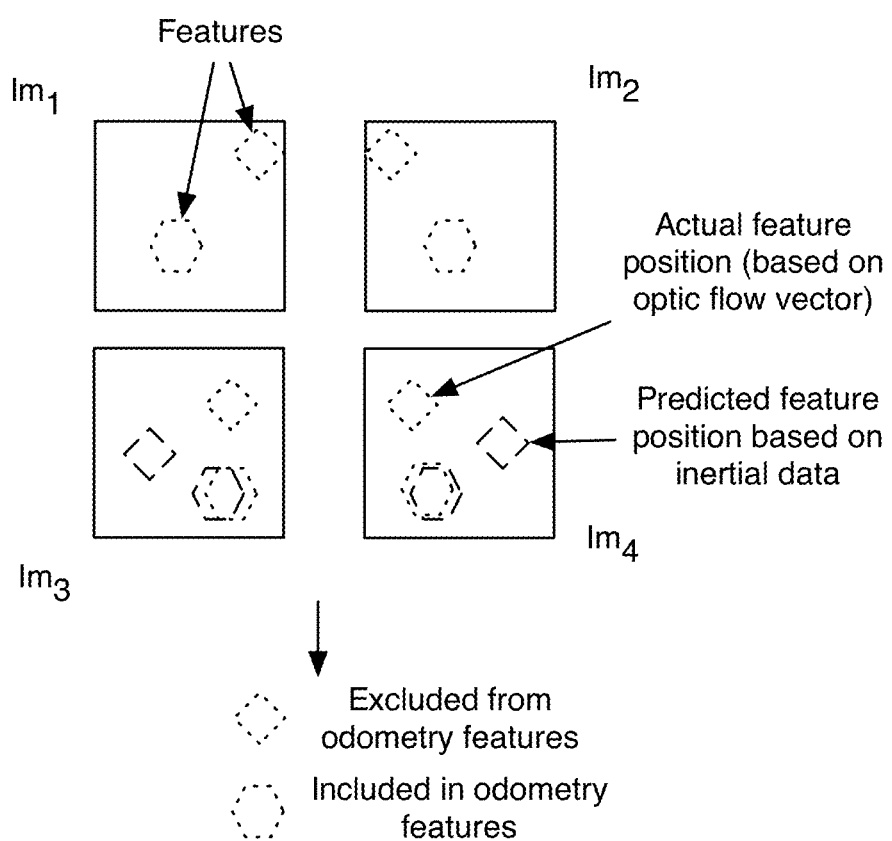
FIG. 8 is a schematic representation of an example of sparsifying features based on inconsistent motion.

In a second variant of S400, as shown for example in FIG. 8, sparsifying the odometry features can include excluding features with inconsistent feature motion (e.g., between frames) and/or including features with consistent feature motion in the set of sparsified features. The constraints are preferably applied based on the auxiliary data (e.g., IMU data), but can be otherwise determined. For instance, S400 can include identifying odometry features that are consistent with the inertial measurements (e.g., have motion, determined from the optic flow vector, that is consistent with the inertial measurements), identifying odometry features that are consistent with feature positions estimated based on inertial measurements, and/or are otherwise consistent with the inertial data. The consistent feature motion is preferably detected between successive images sampled by the same image sensor (e.g., the first and third image, the second and fourth image), but can be detected between images sampled with different image sensors. The inertial data that is used is preferably associated with the image sensor that sampled the image (e.g., a sensor integrated with the image sensor), but can additionally or alternatively be associated with the external system, a different image sensor, and/or any suitable sensor.

In an illustrative example of the second variant, sparsifying the odometry features can include predicting a feature location (e.g., from the first image to the third image, from the second image to the fourth image) based on the inertial data (e.g. sampled by an IMU sensor associated with the camera that captured the images, sampled by an IMU sensor of the external system, an average IMU dataset, etc.), comparing the predicted feature location to the feature location determined by the correspondence map between the images (e.g., a vector of the first optic flow map, a vector of the second optic flow map, etc.), and when a difference between the predicted feature location and the optic flow vector exceeds a threshold, excluding the feature from the set of sparsified features (or including the feature in the sparsified feature set when the distance is below a threshold). In a second illustrative example, consistent feature motion can include excluding features that have an optic flow or disparity vector that exceeds a threshold difference from an average or expected optic flow or disparity vector.

In a third variant, sparsifying the odometry features can include applying non-holonomic constraints to the odometry features. Odometry features that do not move in a manner consistent (and/or in a manner that exceeds a threshold difference from the non-holonomic constraints) with the non-holonomic constraints (e.g., as determined from an optic flow associated with the image) can be excluded from the sparsified features. Odometry features that move in a manner consistent with (e.g., optic flow vector within a threshold difference from that expected for a non-holonomic constraint) the non-holonomic constraints can be included in the sparsified feature set. The non-holonomic constraints can depend on the object classification (e.g., from the first variant above), the image acquisition system, the external system, the application, and/or any suitable information. For example, a terrestrial vehicle generally cannot move purely laterally. The constraints can be automatically determined (e.g., based on historic motion), learned, manually determined, predetermined, and/or otherwise be determined. In an illustrative example, features with optic flow vectors corresponding to lateral system movement can be excluded from the sparsified feature set when the system is mounted to a terrestrial vehicle.

Figure 7:
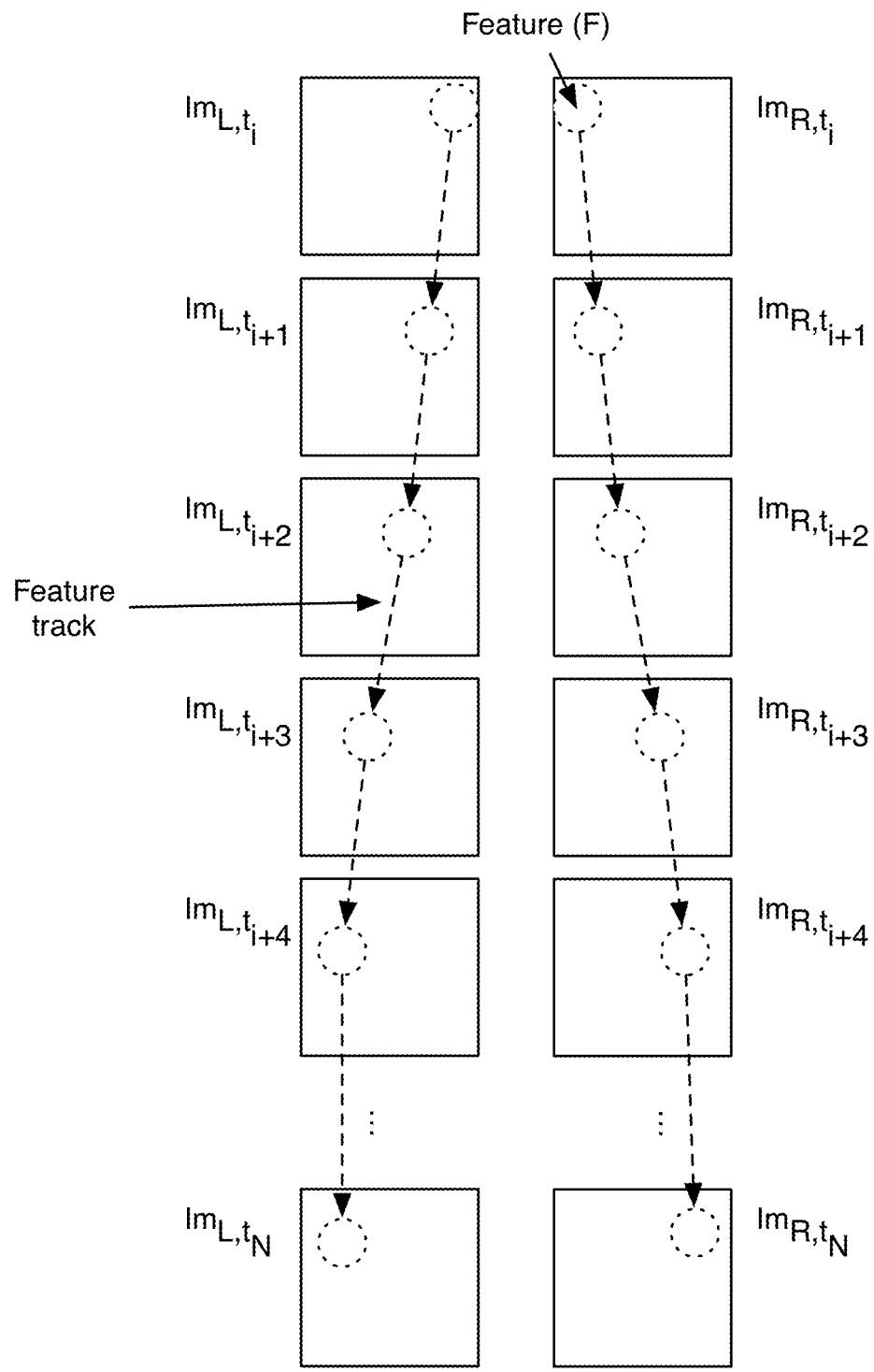
FIG. 7 is a schematic representation of an example of following a feature track.

In a fourth variant, sparsifying the odometry features can include selecting features that have appeared in a threshold number of timesteps, which can function to remove noise and/or decorrelate biases. For example, as shown in FIG. 7, a feature can be included in the sparsified feature set when the feature (e.g., candidate feature, odometry feature) appears in two or more odometry sets, collectively spanning two or more timesteps. The odometry sets are preferably consecutive, but can be nonconsecutive (e.g., within a predetermined number of timesteps, such as 2). Features can be included or excluded from the sparsified feature set as they enter or exit the field-of-view of the images.

However, the odometry features can be sparsified using a combination of one or more of the above, or otherwise determined.

Determining the system egomotion S500 functions to determine the egomotion of the image acquisition system, external system, sensor, and/or any suitable component relative to the environment. S500 can additionally or alternatively determined a system pose (e.g., relative to the scene, environment, starting position, etc.), and/or otherwise function. The system egomotion can be determined directly (e.g., from optic flow maps), indirectly (e.g., by determining the image acquisition system pose at time steps and combining the poses to determine the external system egomotion), and/or otherwise be determined. S500 is preferably performed after S400, but can be performed at the same time as and/or before S400 (e.g., the egomotion can be used to refine the sparsified feature set). S500 can be performed in response to receipt of a request from the external system for egomotion determination, automatically, periodically, in response to image acquisition, and/or at any other suitable time.

The egomotion is preferably determined using a solver, but can be otherwise determined. The solver can be a visual odometry solver, a visual-inertial odometry solver, and/or any suitable solver. Examples of solvers include: Kalman filter, particle filters, unscented Kalman filters, extended Kalman filters, nonlinear filters, bundle adjustment, volumetric flow-based neural networks, end to end solvers, solvers from feature-based VO approaches, solvers from appearance-based VO approaches, solvers from filtering-based VIO approaches, solvers from optimization-based VIO approaches, solvers from hybridized approaches (e.g., smoothing-based approaches, etc.), and/or any suitable solver.

Figure 9:
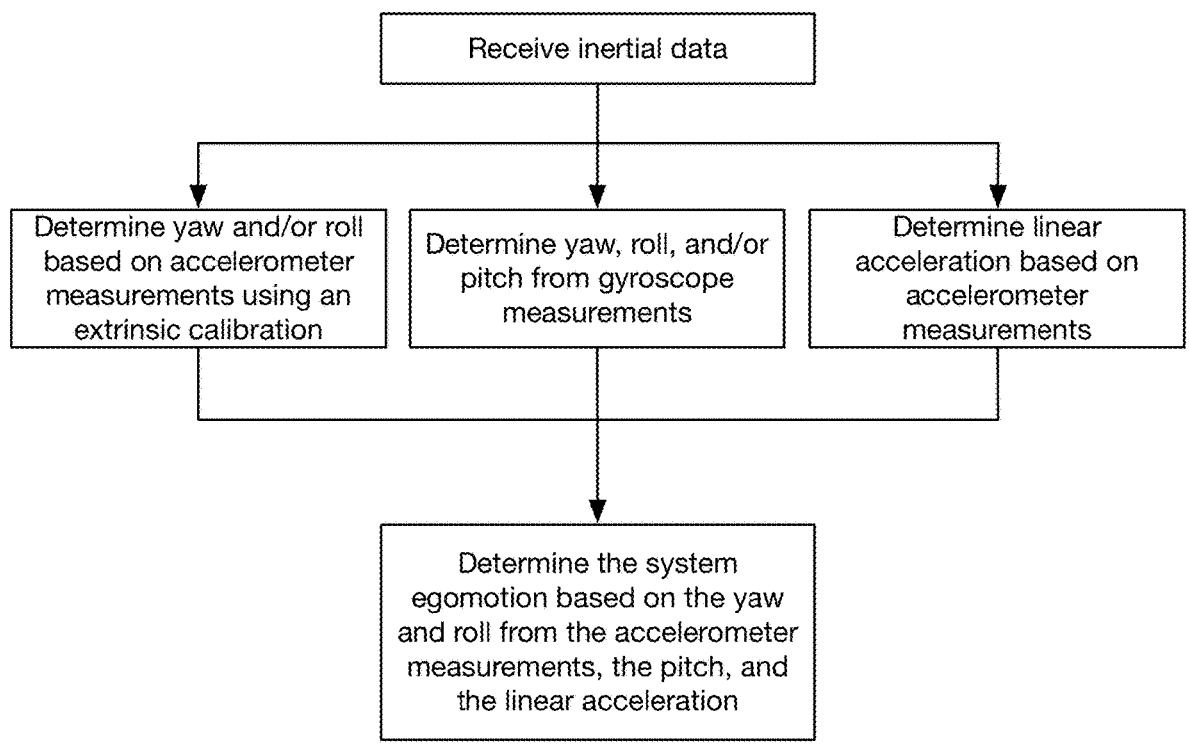
FIG. 9 is a flow diagram representation of an example of determining a system yaw, roll, pitch, and acceleration from inertial data.

Inputs to the solver can include: sparsified features 140, odometry features, a subset of the features (e.g., randomly selected, features selected using a deterministic method, features selected by a low discrepancy sequence, etc.), the disparity map (e.g., between the first and second image, between the third and fourth image), the optic flow map (e.g., between the first and third image, between the second and fourth image), the depth map (e.g., determined from a disparity map, determined from an optic flow map, depth from monocular views, depth from stereoimages, etc.), sensor data (e.g., inertial measurements, denoised inertial measurements, etc.), a prior system state, a feature track (e.g., associated with an odometry feature, associated with a sparsified feature 140, associated with a feature, etc.), one or more images from the odometry set, system kinematics (e.g., linear or radial velocity, acceleration, jerk, or jounce; yaw, roll, pitch, etc.), system component kinematics, and/or any suitable inputs. The inputs can be weighted or unweighted. For example, inertial measurements can be weighted based on a denoised relationship (as determined above). In another example, as shown in FIG. 9, a system yaw and roll can be determined based on accelerometer measurements (e.g., using an extrinsic calibration including a separation and/or orientation between two or more accelerometers, which can be determined from the respective cameras' extrinsic calibration); a system yaw, roll, and/or pitch can be determined based on gyroscope measurements; and a system linear acceleration can be determined from accelerometer measurements. Outputs from the solver can include: the egomotion of the system and/or a subset thereof (e.g., of the image acquisition system, of the external system, of a sensor, etc.), a system or system subset pose, a system or system subset velocity (e.g., instantaneous velocity, average velocity, etc.), a system or system subset heading, an error in the egomotion, an error in the pose, covariances, and/or any suitable information.

S500 can optionally include selecting solutions from the solver that are consistent with one or more motion constraint of the external system. For instance, inputs to and/or outputs from the solver can be subject to non-holonomic constraints that function to limit possible solutions generated by the solver. An example of a non-holonomic constraint is that most terrestrial vehicles are unable to travel in a direction perpendicular to a wheel alignment (at least during normal system operating conditions). However, any suitable constraints can be applied.

In a specific example, the inertial measurements, (sparsified) odometry features' optic flow vectors (e.g., from t−1 to t), (sparsified) odometry features' depth (e.g., at time t), and the prior egomotion or system state (e.g., from t−1) can be provided to a Kalman filter, which determines the updated system state.

S500 can optionally include determining egomotion of the external system, which functions to determine a location or position of the external system. The location and/or position can be absolute (e.g., GPS coordinates, absolute distance traveled, etc.) or relative (e.g., relative to a reference location, relative to a starting location, relative to an ending location, relative to the image acquisition system, relative to a sensor, etc.) Determining egomotion of the external system is particularly, but not exclusively, beneficial when the egomotion for the image acquisition system or the sensor and/or the pose of the external system, image acquisition system, and/or sensor is determined by the solver. Determining the egomotion of the external system can include transforming the solver output to an external system egomotion based on a relationship between the image acquisition system and/or the sensor to the external system, but can be otherwise determined. The relationship is preferably represented by a transformation matrix describing the image acquisition system and/or sensor mounting pose relative to the external system (e.g., relative to a reference of external system such as center of mass, center of motion, extreme location, etc. of the external system; converting the motion from the image acquisition system frame to the external system frame), but can be any suitable information.

External system operation instructions can optionally be determined and/or executed based on the determined external system egomotion (e.g., by the system, by the external system, by a control system, etc.). Examples of external system operation instructions include changing an external system direction, adjusting an external system heading, adjusting an external system speed, changing a vehicle lane, and/or any suitable operation instructions.

S500 can optionally include determining an egomotion of one or more objects represented in the images of the odometry sets. The egomotion of the object(s) can be determined by the solver, be determined based on the optic flow maps, be determined based on the depth maps, be determined based on the disparity maps, and/or otherwise be determined. In an example, egomotion of objects (e.g., objects associated with a transient object class) can be determined by combining (e.g., adding, subtracting, transforming, etc.) the egomotion of the system with an egomotion of the object as determined from the optic flow vectors associated with the object and the depth map associated with the object at different time points. However, the egomotion of objects in the scene can be otherwise determined.

Figure 12:
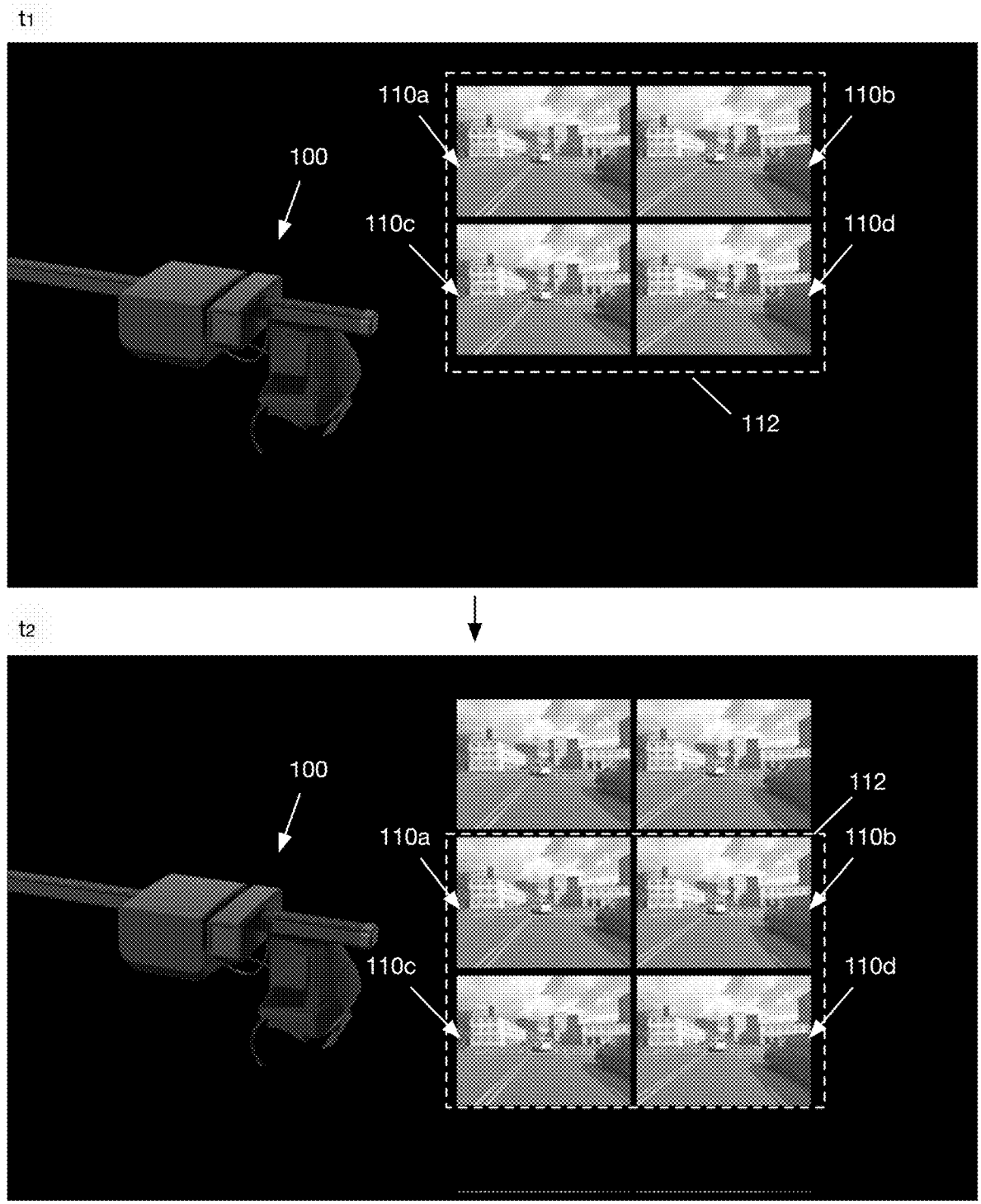
FIG. 12 is an illustrative example of the images sampled by the image sensors of the system at each of a set of timesteps.

In some examples, the method can be performed sequentially, for example by receiving a fifth and sixth image, where in subsequent iterations, the third and fourth images are treated as the first and second images while the fifth and sixth images are treated as the third and fourth images (example shown in FIG. 12). Additionally or alternatively, the method can be performed in parallel for example by receiving a complete set of images associated with a trip or motion of the image acquisition system (or sensor or external system) and determining the egomotion for the entire trip in parallel (e.g., determine the egomotion from each quad of images as described above and/or in any manner at the same time). However, the method can be performed in any manner.

Figure 4:
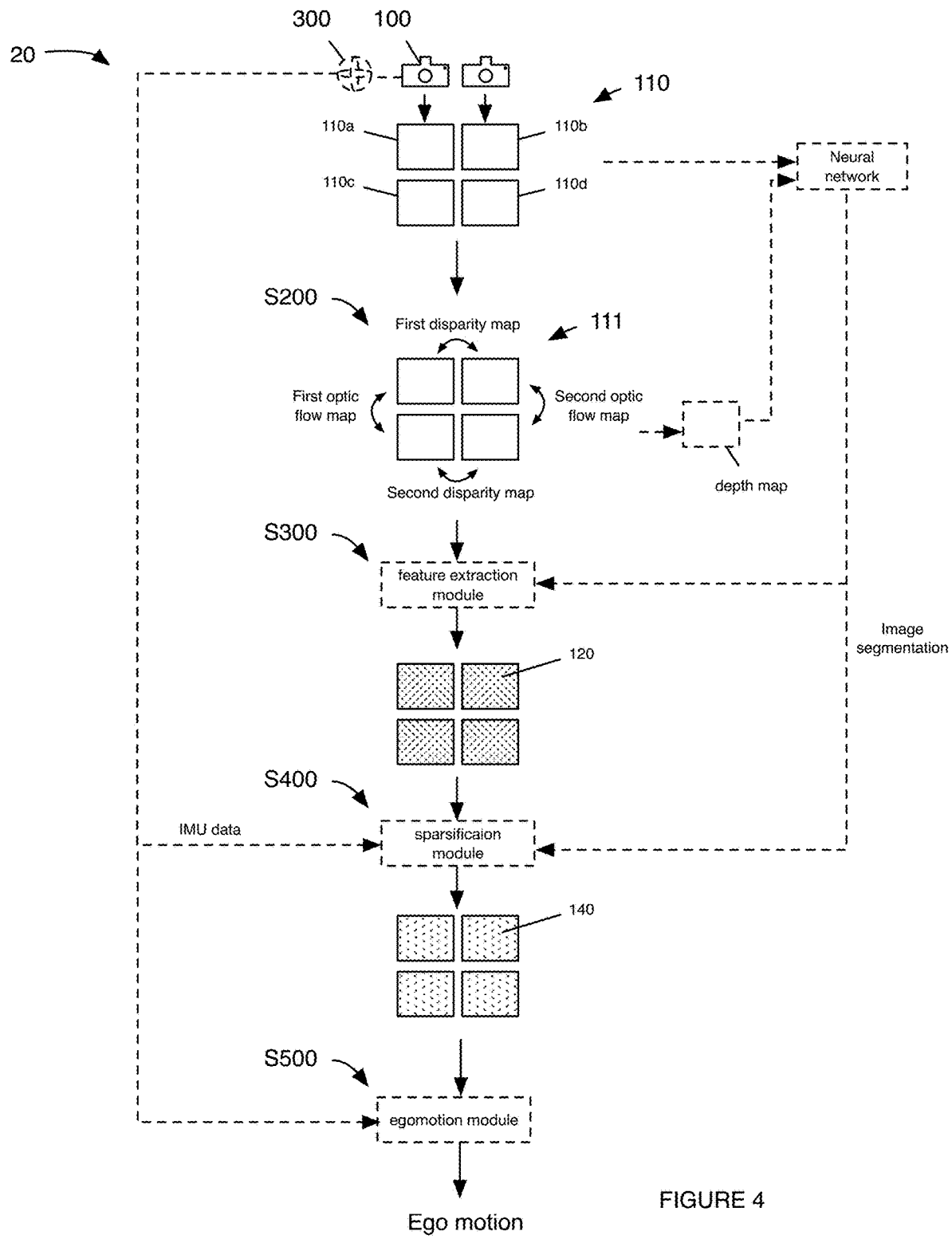
FIG. 4 is a schematic representation of an example of the method.
Figure 5:
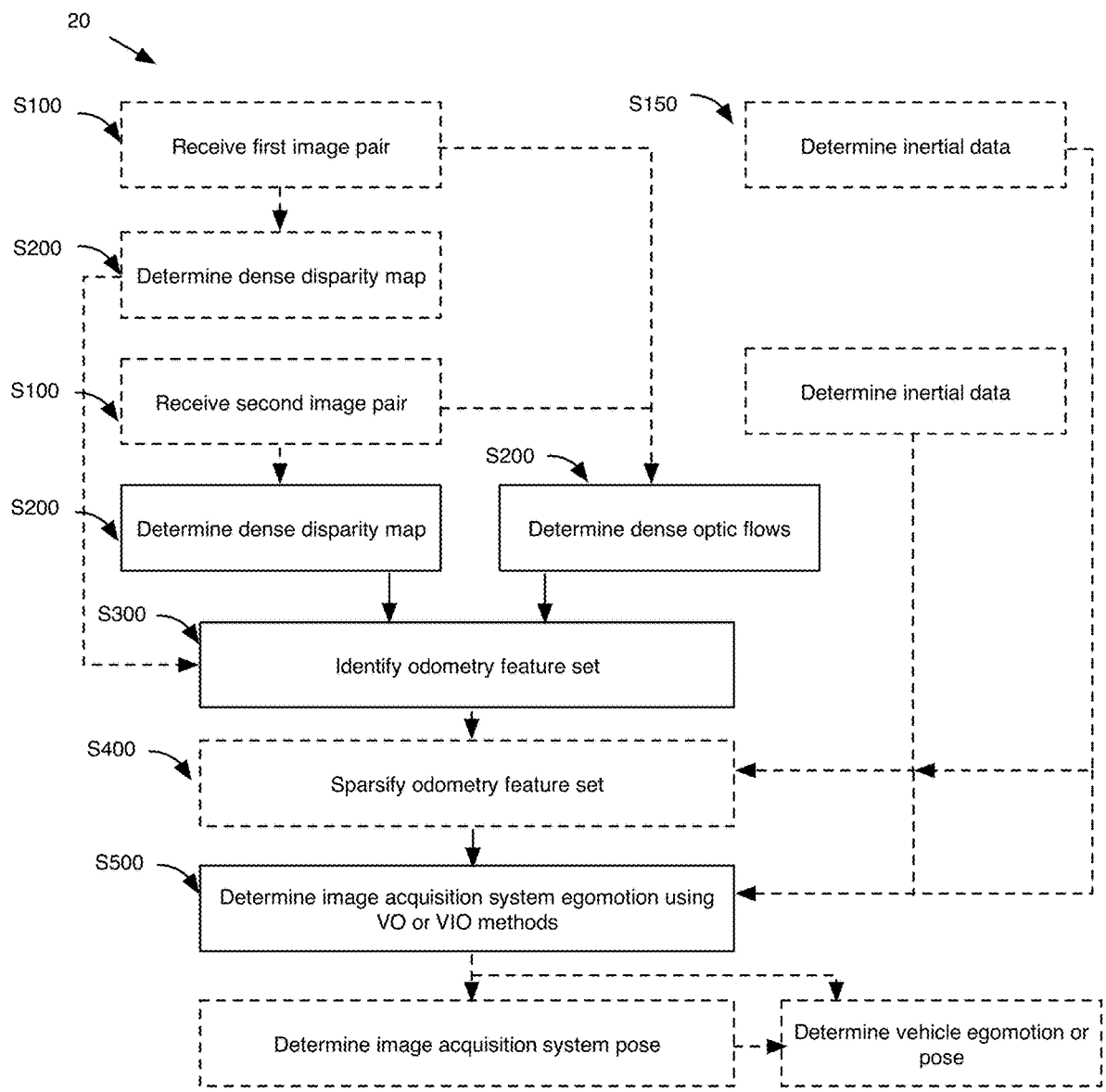
FIG. 5 is a flow diagram representation of an example of the method.
Figure 6:
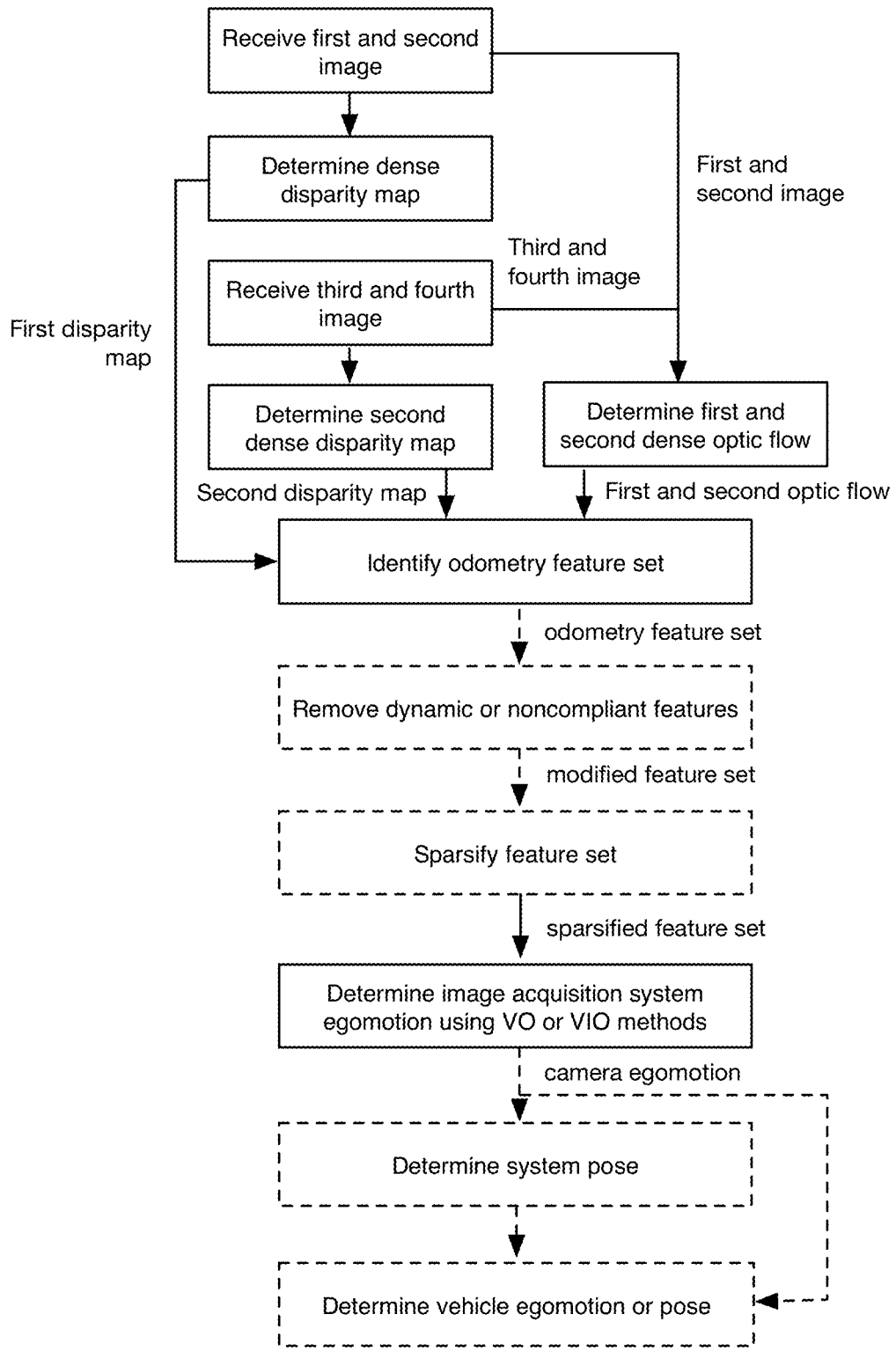
FIG. 6 is a flow diagram representation of an example of the method.

In a specific example, as shown in FIGS. 4, 5 and 6, a method for determining egomotion of a system can include receiving (e.g., acquiring) an odometry image set (e.g., timeseries of stereo images). Disparity maps (and/or depth maps) can be determined for each stereo image pair. Optical flow maps can be determined between consecutive images sampled by the same image sensor. A set of odometry features can be selected based on the disparity maps and/or optic flow. For example, the odometry features can be determined based on a cyclic consistency criterion. The set of odometry features can optionally be sparsified by: classifying the features (e.g., into permanent and transient classes) and excluding the features with a predetermined class; comparing the motion of the features (e.g., across frames) with the motion of the image acquisition system and/or external system (e.g., detected using sensors); by applying one or more motion constraints to the features; based on feature tracking; and/or sparsified in any manner. The features can be nondistinctive or distinctive. The motion (and/or depth) of each odometry feature can optionally be tracked across the time series (e.g., using the optic flow). The odometry features, the corresponding disparity vectors (and/or depths), the corresponding optic flow vectors, inertial data (e.g., from the cameras' sensors), the prior system state, and/or any suitable data can be used to determine the egomotion of the system. For example, the system egomotion can be determined using a visual-inertial odometry solver. However, the egomotion of the image acquisition system and/or external system can be determined in any suitable manner.

The methods of the preferred embodiment and variations thereof can be embodied and/or implemented at least in part as a machine configured to receive a computer-readable medium storing computer-readable instructions. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A method for determining egomotion of a system comprising a first camera and a second camera, the method comprising:
   determining a first dense disparity map that matches features between a first and second image, wherein the first and second images were acquired at a first time by the first and second camera, respectively;
   determining a second dense disparity map that matches features between a third and fourth image, wherein the third and fourth images were acquired at a second time by the first and second camera, respectively;
   determining a first optic flow map that matches features between the first and third image;
   determining a second optic flow map that matches features between the second and fourth image;
   identifying odometry features shared between the first, second, third, and fourth image based on the first and second dense disparity map and the first and second optic flow map; and
   determining the egomotion of the system based on the odometry features.

2. The method of claim 1, wherein the odometry features are identified using a cyclic consistency criterion comprising matching a candidate feature from the first image to a feature in the fourth image along each of a first and second path determined from the first and second dense disparity maps and the first and second optic flow maps.

3. The method of claim 2, wherein the first path comprises a first optic flow vector from the first optic flow map and a first disparity vector from the second disparity map; wherein the second path comprises a second disparity vector from the first disparity map and a second optic flow vector from the second optic flow map; and wherein the first and second optic flow vectors and the first and second disparity vectors are associated with the candidate feature.

4. The method of claim 1, further comprising sparsifying the odometry features, wherein the egomotion is determined using the sparsified odometry features.

5. The method of claim 4, wherein sparsifying the odometry features comprises:
   segmenting at least one of the first, second, third, or fourth image into transitory segments and permanent segments; and
   excluding features associated with transitory segments from the odometry features.

6. The method of claim 5, further comprising estimating an egomotion of objects in the transitory segments based on the egomotion of the system.

7. The method of claim 4, wherein sparsifying the odometry features comprises:
   receiving an IMU dataset; and
   for each of the odometry features:
      predicting a feature position in the third image based on the corresponding feature position in the first image and the IMU dataset;
      comparing the predicted feature position to an actual feature position determined based on an optic flow vector associated with the feature; and
      when the actual and predicted feature positions are different, removing said odometry feature from the odometry features.

8. The method of claim 1, further comprising:
   determining system yaw and roll based on accelerometer measurements;
   determining linear acceleration based on the accelerometer measurements; and
   determining the egomotion using a visual-inertial odometry solver based on the system yaw, roll, and linear acceleration.

9. The method of claim 8, wherein the system yaw and roll are determined based on accelerometer measurements using an extrinsic calibration of an accelerometer pose.

10. The method of claim 1, wherein the determined egomotion is consistent with a motion constraint of the system.

11. The method of claim 1, further comprising determining a pixel hash for each pixel in the first and second image; wherein determining the first disparity map comprises iteratively:
   determining a set of candidate correspondence vectors for each pixel in the first image based on correspondence vectors of neighboring pixels, wherein each correspondence vector identifies a corresponding pixel in the second image that is paired with the respective pixel; and
   selecting a candidate correspondence vector from the set as the correspondence vector of said each pixel based on a cost value determined between the pixel hashes of said each pixel and the corresponding pixels.

12. The method of claim 1, wherein each odometry feature is a pixel.

13. A non-transitory computer-readable storage medium storing instructions that, when executed by a processor, cause the processor to perform a method comprising:
   determining a first dense disparity map matching features between a first and second image, acquired at a first time, by a first and second camera, respectively;
   determining a second dense disparity map matching features between a third and fourth image, acquired at a second time, by the first and second camera, respectively;
   determining a first optic flow map matching features between the first and third image;
   determining a second optic flow map matching features between the second and fourth image;
   identifying odometry features shared between the first, second, third, and fourth image based on the first and second dense disparity map and the first and second optic flow map; and
   determining the egomotion of a system, comprising the first and second cameras, based on the odometry features.

14. The computer readable storage medium of claim 13, wherein the odometry features are identified using a cyclic consistency criterion comprising matching a candidate feature from the first image to a feature in the fourth image along each of a first and second path.

15. The computer readable storage medium of claim 14, wherein the first path comprises a first optic flow vector from the first optic flow map and a first disparity vector from the second disparity map; wherein the second path comprises a second disparity vector from the first disparity map and a second optic flow vector from the second optic flow map; and wherein the first and second optic flow vectors and the first and second disparity vectors are associated with the candidate feature.

16. The computer readable storage medium of claim 13, further storing computer program instructions for sparsifying the odometry features, wherein the egomotion is determined using the sparsified odometry features.

17. The computer readable storage medium of claim 16, wherein sparsifying the odometry features comprises:

segmenting at least one of the first, second, third, or fourth image into transitory segments and permanent segments; and excluding features associated with transitory segments of the segmented image from the odometry features.

18. The computer readable storage medium of claim 16, wherein sparsifying the odometry features comprises:
    receiving an IMU dataset; and
    for each of the odometry features:
        predicting a feature position in the third image based on the corresponding feature position in the first image and the IMU dataset;
        comparing the predicted feature position to an actual feature position determined based on an optic flow vector associated with the feature; and
        when the actual and predicted feature positions are different, removing said odometry feature from the odometry features.

19. The computer readable storage medium of claim 13, further storing computer program instructions for:
    determining system yaw and roll based on accelerometer measurements;
    determining system yaw, roll, and pitch based on gyroscope measurements;
    determining linear acceleration based on the accelerometer measurements; and
    determining the egomotion using a visual-inertial odometry measurements based on the system yaw and roll from the accelerometer and gyroscope measurements, the pitch, and the linear acceleration.

20. The computer readable storage medium of claim 19, wherein the system yaw and roll are determined based on accelerometer measurements using an extrinsic calibration of an accelerometer pose.

* * * * *